2,782,198
Patented Feb. 19, 1957

2,782,198

HALOGENATION OF UREA-DIACETONE ALCOHOL AND UREA-MESITYL OXIDE REACTION PRODUCTS

Mortimer T. Harvey, South Orange, N. J., assignor to Harvel Research Corporation, a corporation of New Jersey No Drawing. Application July 27, 1953,
Serial No. 370,613

10 Claims. (Cl. 260—251)

This invention relates to novel products and to methods for preparing them and also to novel compositions in which said products are components. This application is a continuation in part of my copending application Ser. No. 230,855, filed June 9, 1951, now abandoned, which in turn is a continuation in part of my copending application Ser. No. 209,202, filed February 2, 1951. In my copending application Serial No. 209,202 of February 2, 1951, which is hereby in its entirety made part hereof, I have disclosed novel compounds produced by reacting urea with mesityl oxide, diacetone alcohol or mixtures thereof. In one of its more specific aspects this invention is directed to derivatives of said compounds and especially to the halogenated and other derivatives thereof.

The compounds disclosed in said copending application Ser. No. 209,202, I believe to be isomers and in general may be produced by reacting urea with mesityl oxide or diacetone alcohol in equimolecular proportions and in the presence of an acetic catalyst. The resultant substantially chemically pure compounds have the empirical formula $C_7N_2H_{12}O$, and the following probable structural formula:

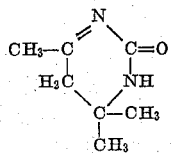

In general, the starting compounds may be produced by reacting 1 mole of urea with 1 mole of mesityl oxide or diacetone alcohol in the presence of an acidic agent or catalyst which may be a mineral acid, examples of which are hydrochloric acid and sulfuric acid. In one of its specific aspects the urea may react with diacetone alcohol or mesityl oxide while slowly adding with constant stirring to said mixture an acidic agent such as dry hydrochloric acid. The reaction during the hydrochloric addition is exothermic and the temperature of the reacting mass is preferably maintained over the most part between 25–50° C. and preferably between about 35–40° C. by external cooling and by controlling the rate of hydrochloric addition to the mass. The quantity of hydrochloric acid added during the reaction may vary. For example, in a mass of 60 g. of urea and 135 g. of diacetone alcohol or mesityl oxide, between 10–100 of dry hydrochloric acid may be used. After the last increment of dry hydrochloric acid has been added and the reacting mass has been maintained substantially continuously at 25–50° C. and preferably between 35–40° C. to reduce or completely obviate resinous formation which takes place at higher temperatures and to obtain high yields of the desired compound, the mass after substantial completion of the exothermic reaction may be poured into an equal volume of cold water and allowed to stand for cooling whereupon crystallization occurs. Instead of pouring the reaction mass at that stage into the cold water it may be allowed to stand for from 3 to 72 hours for somewhat enhancing the yield. In any case the reaction mass in combination with the water may be immediately neutralized by the addition of aqueous sodium hydroxide and then allowed to cool, preferably overnight, whereupon crystals precipitate out. The crystals may be separated from the liquid phase in any desired manner such as by filtration and then the raw crystals containing some impurities may be admixed with alcohol or a solution of equal volume of alcohol and water. The mixture is brought to boiling so that solution of the crystals takes place and then the hot mixture is rapidly filtered. The filtrate is cooled whereupon crystallization occurs. The crystals therein are subjected to 4 or 5 more further recrystallizations in the manner hereinbefore set forth whereupon there is obtained a substantially chemically pure product composed of carbon, hydrogen, nitrogen and oxygen.

The urea-mesityl oxide and urea-diacetone alcohol reaction products are composed of carbon, hydrogen, nitrogen and oxygen, each containing substantially 60% by weight of carbon and 20% by weight of nitrogen and have the following empirical formula: $C_7N_2H_{12}O$ and in their purified state normally are white crystalline solids soluble in hot water, soluble in hot alcohol and soluble in hot alcohol-water and soluble in hot alcohol-toluene 1–1. The crystals made with diacetone alcohol are what I term monodiacetone alcohol-mono urea and have a melting point of approximately 279–280° C., while those made with mesityl oxide are what I term mono mesityl oxide-mono urea and have a melting point of approximately 290–291° C. These compounds appear to have the structural formula heretofore set forth or are apparently isomers thereof.

The following are examples given merely for the purpose of illustrating methods of producing the starting compounds employed in this invention without in any way limiting the invention, all parts given being by weight unless otherwise specified.

Example 1

Although the molecular ratio of reactants may be varied, I prefer to employ them in approximately equimolecular proportions. 240 grams of urea and 540 grams of diacetone alcohol were placed in a glass reacting vessel. Then over a period of approximately 30 minutes, while the mass was being constantly stirred, there was slowly and uniformly bubbled therein about 56 grams of dry hydrochloric acid while the temperature of the mass, with the aid of external cooling as required, was maintained at approximately 40° C. throughout substantially the entire addition. During that period solution and reaction took place. After the termination of the hydrochloric acid addition, the mass was still maintained in the stage of agitation by stirring and at a temperature no greater than 40° C. for approximately an additional 15 minutes. Then with the cooling medium completely removed the mass was allowed to stand for a period of 3 to 72 hours. At the end of that period of standing the mass was poured into an approximately equal volume of water and then there was added thereto a quantity of a solution of aqueous sodium hydroxide to render it substantially neutral and at this stage considerable crystallization occurred. The neutralized mass was allowed to stand for cooling for a period of about 16 hours and then the crystals were separated from the liquid phase by filtration or any other convenient method. The raw crystals were then dissolved in a hot 1–1 alcohol-water solution and the temperature of the mass was elevated to about boiling and at this temperature the mass was filtered. The filtrate was allowed to cool whereupon crystallization takes place. The crystals were separated from the liquid phase and were again treated in the manner before set forth for recrystallization. This recrystallization procedure was carried out 3-6 more times to provide 350 grams of substantially chemically pure crystalline product known as Product A having a melting point of approximately 279-280° C. and shows decomposition at or about said melting point, and having the empirical formula and probable structural formula before set forth or apparently being an isomer thereof.

*Example 2*

Employing the same procedure as that set forth in Example 1 and employing 540 grams of mesityl oxide in place of the diacetone alcohol, there is obtained a novel compound having the same empirical formula before set forth and either having the probable structural formula set forth or apparently being an isomer thereof. When mesityl oxide is employed, the reaction proceeds considerably faster than with the diacetone alcohol and considerably greater care must be exercised in maintaining the temperature of the mass during reaction at the preferred 35-40° C. level. In this case it is not as necessary although advisable for maximum yields to allow the mass to stand after the exothermic reaction has subsided and therefore at the termination of that reaction the mass may be poured directly into the cold water and the neutralization, crystallization and recrystallization as set forth in Example 1 are carried out and there is obtained more than 250 grams of substantially chemically pure, crystalline product known as Product B having a melting point of approximately 290-291° C.

*Example 3*

An alternate method for producing the compounds Product A and Product B of Examples 1 and 2 is to place 1¾ moles of concentrated sulfuric acid in a glass lined reacting vessel. Then, while being constantly stirred, there is added thereto slowly and while being externally cooled 1 mole proportion of powdered urea. The vessel is being constantly cooled during the addition to maintain the temperature of the mass at a value of no higher than 40° C. and between about 35-40° C. After all of the urea has been added to the sulfuric acid, to this mass there is slowly added 1½ mole proportion of diacetone alcohol or mesityl oxide while the mass is being constantly stirred and maintained at a temperature between 35-40° C. Then the mass is allowed to stand for at least 24 hours and is subsequently diluted with two volumes of water and neutralized with an aqueous solution of sodium hydroxide. The neutralized mass is allowed to stand for cooling and crystallization for a period of about 16 hours. The crystalline precipitate may be purified in the same manner as that described in Examples 1 and 2.

According to this invention, I have provided novel compounds which are derivatives of those compounds A and B. The compounds A and B may be halogenated by contacting them with free halogen. By contacting them with free halogen, the compounds become halogenated and I believe that initially there is an addition of two halogen atoms and that such addition occurs at the nitrogen to carbon double bond apparently present in the compounds, so that one bond of that double bond is replaced by a halogen on that nitrogen and a halogen at that carbon. Where additional halogenation occurs, I believe that the halogen replaces some of the hydrogen atoms thereof because I have halogenated said compounds to the extent of hexa-halogenation by contacting them with free halogen. Broadly, I may halogenate them by treating them with a solution of the desired halogen, such as bromine in water or alcohol, iodine in alcohol or with chlorine or fluorine added directly to an alcohol solution of the compounds, to provide the halogen derivatives thereof.

The following are examples given merely for the purpose of illustrating methods for producing specific halogenated compounds, without in any way limiting the invention, all parts being given by weight unless otherwise specified.

*Example 4*

Approximately 10 to 15 grams of Product A was put in a large beaker with 100 cc. of ethyl alcohol. Bromine in solution in ethyl alcohol was added in small increments to the above mixture at room temperature. As the bromine solutions were being added to the said Product A, reaction took place and the bromination product of Product A passed into a colorless solution in the alcohol. When all of said Product A has become brominated, excess bromine colors the alcohol and serves as an indicator showing the completion of the reaction. After allowing to stand at room temperature for two or three days, precipitation occurred in crystals which were filtered and recrystallized from alcohol twice. Analysis of the resultant crystalline bromination product showed 51.1% of bromine, which indicated a di-bromine compound of Product A. Theoretical quantity of bromine in di-bromine derivative is 53%.

*Example 5*

Approximately 10-15 grams of Product A was placed in a large beaker and covered with 200 cc. of alcohol. Chlorine was bubbled into said mass until substantially complete solution took place due to the chlorination of Product A. The mass was then allowed to stand for 3-4 days at room temperature whereupon precipitation took place. The crystals were separated from the liquid phase by filtration and recrystallization twice from alcohol. The resultant crystals analyzed 60.0% chlorine indicating an hexachlor derivative of Produce A (theoretical 60.08%).

*Example 6*

Following the same procedure as that of Example 4, except that iodine is substituted for bromine. Because the iodine reaction is more difficult than either that when bromine or chlorine is used, in this case a small amount of mercury nitrate was added to speed up the reaction. Analysis of the resultant crystalline product showed that the di-iodide derivative had been produced.

*Example 7*

Follow the same procedure as that of Example 5, except that fluorine was substituted for the chlorine. Analysis of the resultant crystalline product showed that the di-fluoride derivative had been produced.

*Example 8*

Approximately 20 grams of Product A was placed in a large beaker and covered with 250 cc. of alcohol. Then there was added thereto an alcohol solution of bromine. The bromine solution was carefully and slowly added until an excess of bromine became evident. The entire mass was poured into about twice its volume of water whereupon the bromine derivatives are thrown out in the form of crystals. These all were analyzed and showed 52% bromine by weight and were separated from the liquid phase of the mass.

*Examples 9-12*

Following the same procedure as those set forth in Examples 4-7 respectively except that Product B was substituted for Product A, there were produced corresponding halogen derivatives of Product B.

The halogen derivatives may then be substituted to provide a wide variety of other derivatives. For example, they may be treated with alkali cyanide such as NaCN to replace either one or all of the halogen atoms to provide cyanide derivatives. For example, the bromine derivatives may now be dissolved in alcohol and to this solution is carefully added an alcohol dispersion of NaCN. The mixture is warmed over an extended period of time, say several hours, whereupon there is a reaction converting the bromide to cyanide compounds.

The halogen derivatives may be treated with an aqueous solution of an alkali hydroxide, such as sodium hydroxide, potassium hydroxide, lithium hydroxide, etc. to substitute OH groups in place of the halogens; they may be treated with a solution of sodamide to replace one or all of the halogens with an $NH_2$ group. These various substituted derivatives may in turn serve as intermediates for the production of other compounds. For example, the cyanide derivatives may be hydrolyzed by the use of a weak aqueous solution of an acid, such as HCl to convert them to the carboxyl derivatives, in this manner each CN group is converted to COOH; the hydroxy derivatives may be converted to the metal salts by the use of metallic sodium for example to replace the H of each OH group with sodium or by the use of any other appropriate reactant for replacing such hydrogen atoms with the metal desired depending upon the metal derivative required.

The last named derivatives may in turn serve as intermediates for the production of still other novel compounds. The carboxyl derivatives may be reacted with a wide variety of compounds for the production of various salts and esters thereof whereby the H of each COOH is replaced with a desired metal, such as cobalt, nickel, copper, manganese, etc. or any desired organic group such as a hydrocarbon group such as $CH_3$, $C_2H_5$, etc.

All the aforementioned derivatives of the starting compounds as well as the starting compounds A and B themselves may be hydrogenated to convert the ketone group (CO) to an alcohol group (COH) which in turn may have the H of the COH replaced with any desired metal such as sodium or potassium.

Also according to this invention, one or a combination of two or more of the novel products of this invention and particularly the metal derivatives are combined with an animal feed which of course may vary in its composition depending upon the particular class of animal to be fed, and serve as growth stimulants and sometimes as therapeutic agents, and act somewhat similar to vitamins especially when fed to poultry. In most cases, according to this invention, the animal feed has added thereto a quantity of one or more of said products in small amounts so that the resultant feed contains a minor proportion of said reaction products and no more than 25% and generally from .001%–1% by weight of said reaction product depending upon the manner of feeding to be used.

A convenient method that I have employed in the practice of this phase of my invention is to disperse one of said products in purified and finely ground condition as an additive to the normal animal feeds employed either as a sole or part ratio for the animals to be fed. The particular novel product either alone or in combination with each other may be dissolved in a small amount of hot alcohol and the resultant solution may be dispersed in any convenient manner in the feed and the feed dried to drive off the solvent. If desired, these compounds may be mixed directly into the feed. Also they may be dispersed in any of the edible oils such as cocoanut, olive, cottonseed or the like and the resultant mixture may be dispersed in the solid particles of the feed. Any of the commercial or "farm mixed" feeds may be employed as carriers of these compounds. The feeds to which such compounds are to be added generally stated contain a quantity of grains, sometimes in the ground form, meat or other protein substitute, minerals and vitamins sufficient to furnish an adequate diet to suit the requirements of the animals to be fed.

The halogen derivatives particularly also find application as fungicides; also may be milled into rubber, natural or synthetic such as polymerized chloroprene, homopolymerized butadiene, copolymers of butadiene and styrene, copolymers of butadiene and acrylonitrile to improve the ageing characteristics thereof and for this purpose I employ 1–5 parts by weight of one or a combination of two or more of said halogen derivatives for 100 parts of rubber or synthetic rubber; also they may be reacted with hydrogen peroxide by warming a mixture of a halogenated derivative together with an aqueous solution of hydrogen peroxide, then allowed to stand at room temperature. The resultant reaction product may be combined with alkyd resins to modify them.

It is to be understood that the following claims are intended to cover all the generic and specific features of the invention herein described and all statements of the scope of the invention which as a matter of language might be said to fall therebetween; and that they are intended to be inclusive in scope and not exclusive, in that, if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

I claim:

1. The method comprising halogenating a compound selected from the group consisting of (a) urea-diacetone alcohol organic reaction product which in substantially purified condition is normally a white crystalline solid having a melting point of approximately 279–280° C. and (b) urea-mesityl oxide organic reaction product which in substantially purified condition is normally a white crystalline solid having a melting point of approximately 290–291° C. by contacting said compound with free halogen to combine with said compound 2–6 atoms of halogen per mole of said compound, said (a) and (b) each having the empirical formula of $C_7N_2H_{12}O$ and each being soluble in hot water, soluble in hot alcohol, soluble in hot alcohol-water and soluble in hot alcohol-toluene 1–1, said (a) and (b) obtainable by reacting 1 mole of urea with a compound selected from the group consisting of 1 mole of mesityl oxide and 1 mole of diacetone alcohol respectively in the presence of HCl catalyst.

2. The method according to claim 1, with said halogen being chlorine.

3. The method according to claim 1, with said halogen being fluorine.

4. The method according to claim 1, with said halogen being bromine.

5. The method according to claim 1, with said halogen being iodine.

6. A novel composition of matter produced according to claim 1.

7. A novel composition of matter produced according to claim 2.

8. A novel composition of matter produced according to claim 3.

9. A novel composition of matter produced according to claim 4.

10. A novel composition of matter produced according to claim 5.

No reference cited.